US008983945B1

United States Patent
Xie et al.

(10) Patent No.: US 8,983,945 B1
(45) Date of Patent: Mar. 17, 2015

(54) MATCHING VIDEO CONTENT TO VIDEO BIBLIOGRAPHIC DATA

(75) Inventors: Zhiyi Xie, Shanghai (CN); Varun Kacholia, Sunnyvale, CA (US); Minya Dai, Milpitas, CA (US); Patrick Hung, San Bruno, CA (US); Kun Zhang, Mountain View, CA (US); Jonathan Eng, Hacienda Heights, CA (US); Nicola Muscettola, Sunnyvale, CA (US); Omer Bar-or, Mountain View, CA (US); Aparna Chennapragada, Mountain View, CA (US); Nitin Khandelwal, Mountain View, CA (US)

(73) Assignee: Google Inc., Mountain View, CA (US)

( * ) Notice: Subject to any disclaimer, the term of this patent is extended or adjusted under 35 U.S.C. 154(b) by 347 days.

(21) Appl. No.: 13/342,617

(22) Filed: Jan. 3, 2012

Related U.S. Application Data

(60) Provisional application No. 61/523,809, filed on Aug. 15, 2011.

(51) Int. Cl.
*G06F 17/30* (2006.01)
(52) U.S. Cl.
USPC .............. 707/727; 707/E17.014; 707/17.044; 707/17.108
(58) Field of Classification Search
USPC ........................................................ 707/727
See application file for complete search history.

(56) References Cited

U.S. PATENT DOCUMENTS

| | | | |
|---|---|---|---|
| 2005/0027687 A1* | 2/2005 | Nowitz et al. ...................... 707/3 |
| 2008/0010262 A1* | 1/2008 | Frank ................... 707/3 |
| 2008/0010605 A1* | 1/2008 | Frank ............................ 715/765 |
| 2009/0164438 A1* | 6/2009 | Delacruz ........................... 707/3 |
| 2009/0217806 A1* | 9/2009 | Makino et al. ................... 84/616 |
| 2010/0097662 A1* | 4/2010 | Churilla et al. ............... 358/448 |
| 2010/0322373 A1* | 12/2010 | Churilla ........................... 378/4 |
| 2011/0087956 A1* | 4/2011 | Sherman et al. .............. 715/233 |
| 2012/0011425 A1* | 1/2012 | Banker ......................... 715/205 |

* cited by examiner

*Primary Examiner* — Shyue Jiunn Hwa
(74) *Attorney, Agent, or Firm* — Harrity & Harrity, LLP

(57) ABSTRACT

The present disclosure relates to the identification of video content. In one aspect, a method includes generating a query based on bibliographic data. The method also includes obtaining a collection of resources responsive to the query, wherein one or more of the resources include text and video content. The method further includes calculating occurrence scores for the resources. A particular occurrence score for a particular resource is based at least in part on the bibliographic data matching text included in the particular resource and the text being associated with video content. The method further includes selecting one or more resources as including video content identified by the bibliographic data using the occurrence scores. The method further includes storing data associating the selected resources with the bibliographic data.

21 Claims, 4 Drawing Sheets

MATCHING VIDEO CONTENT TO VIDEO BIBLIOGRAPHIC DATA

CROSS-REFERENCE TO RELATED APPLICATIONS

The present application claims the benefit of U.S. Provisional Application No. 61/523,809 entitled "Matching Videos to Video Items" filed 15 Aug. 2011, which is incorporated by reference herein.

BACKGROUND

The present disclosure relates to the identification of video content. In particular, it relates to identifying video content that corresponds to the same video item, for example the same music video, movie or television show episode.

Information retrieval systems, such as Internet search engines, are responsive to a user's query to retrieve information about accessible resources such as web pages, images, text documents and multimedia content. A search engine locates and stores the location of resources and various descriptions of the retrieved information in a searchable index. The search engine may then determine the relevance of the resources in the index to the user's query.

Some search engines enable users to search for specific types of content. For example, a video search engine may generate video search results that identify web pages or other documents containing videos that the user may play or download. The search engine may search metadata associated with the video, and/or textual video descriptions within a web page containing or referencing the video, for matches as to terms in the user's query. Due to the amount of video content available from a wide variety of sources and relatively thin metadata or descriptions, video search results may be imprecise. That is, the search results may include a number of videos which match the user's query, but which are unrelated to the video item of interest to the user.

SUMMARY

In one implementation, a method of identifying video content identified by a video bibliographic entry is described. The method includes formulating a query based on one or more terms in one or more fields of a video bibliographic entry. The method further includes requesting search results for the formulated query. The method further includes receiving the search results identifying a list of resources from the search engine in response to the query. Resources in the list of resources include text and video content. The method further includes calculating occurrence scores for the resources. A given occurrence score for a given resource is based at least in part on whether terms in the fields of the video bibliographic entry occur within text associated with video content in the given resource. The method further includes selecting one or more resources in the list of resources as including video content identified by the video bibliographic entry using the occurrence scores. The method further includes storing data associating the one or more selected resources with the video bibliographic entry.

These and other embodiments of the technology disclosed can each optionally include one or more of the following features. The formulated query can include a phrase of terms in a given field of the video bibliographic entry.

The formulated query can be based on query refinements for one or more terms in a given field of the video bibliographic entry.

The given occurrence score for the given resource can be based at least in part on differently weighting fields of the video bibliographic entry having terms occurring within the associated text.

The given occurrence score for the given resource can be based at least in part on whether the associated text includes a phrase boundary next to an occurrence of one or more terms in a particular field of the video bibliographic entry.

The given occurrence score for the given resource can be based at least in part on a number of instances of video content in the given resource.

The given occurrence score for the given resource can be based at least in part on a uniform resource locator of the given resource.

Selecting one or more resources in the list of resources can include sorting the resources using the occurrence scores to create a ranking. One or more selected resources can then be selected based at least in part on the ranking.

The given occurrence score for a given resource can be based at least in part on whether one or more terms in the one or more fields of the video bibliographic entry occur within text adjacent to video content in the given resource.

Other implementations may include a non-transitory computer readable storage medium storing instructions executable by a processor to perform a method as described above. Yet another implementation may include a system including memory and one or more processors operable to execute instructions, stored in the memory, to perform a method as described above.

In another implementation, a method including generating a query based on bibliographic data is described. The method further includes obtaining a collection of resources responsive to the query, where one or more of the resources include text and video content. The method further includes calculating occurrence scores for the resources. A particular occurrence score for a particular resource is based at least in part on the bibliographic data matching text included in the particular resource and the text being associated with video content. The method further includes selecting one or more resources as including video content identified by the bibliographic data using the occurrence scores. The method further includes storing data associating the selected resources with the bibliographic data.

Particular embodiments of the subject matter described herein can be implemented for accurately identifying videos that correspond to the same video item. This identification can be used by the search engine to assess the relevance of video content in the resources to a user's video content search.

Particular aspects of one or more embodiments of the subject matter described in this specification are set forth in the drawings and the description below. Other features, aspects, and advantages of the subject matter will become apparent from the description, the drawings, and the claims.

DETAILED DESCRIPTION

The technology described identifies video content from multiple sources that corresponds to a particular video item, for example a music video, movie or television show episode, that is identified by bibliographic data, e.g. represented in the form of a video bibliographic entry. The technology includes analyzing a list of resources identified by search results provided by a search engine in response to a formulated query based on the video bibliographic entry. A resource may for example be an image, audio, video or webpage. In some situations, a resource may include video content.

The formulated query is based on terms in fields of a video bibliographic entry that represents a particular video item, for example a music video, movie or television show episode. A video bibliographic entry is divided into fields, where each field can include terms about a particular attribute of the video item that is represented by the entry.

The formulated query may, for example, include terms from one or more fields of the video bibliographic entry. As another example, the formulated query may be a query refinement of one or more terms in a given field of the given video bibliographic entry.

In some implementations, analyzing a list of resources includes screening the resources in the list by calculating occurrence scores. An occurrence score for a given resource is based at least in part on whether the resource includes embedded video content or linked video content, and whether terms in the fields of the video bibliographic entry occur within text associated with embedded or linked video content in the resource.

The techniques for determining the occurrence scores and the range of occurrence scores can vary from implementation to implementation. For example, the occurrence score for a resource may be based at least in part on the number of fields that have been identified as occurring within the associated text. In some implementations, the occurrence score for a resource may be equal to the total number of fields which were identified. In some implementations, the occurrence score may be a weighted average based on which of the fields were identified.

The occurrence scores are then used to select one or more resources in the list as including video content corresponding to the video bibliographic entry. Data associating the selected resources with the video bibliographic entry can then be stored for use by a computerized process. This data may for example be used by the search engine to assess the relevance of video content in the resources to a user's search.

Figure 1:
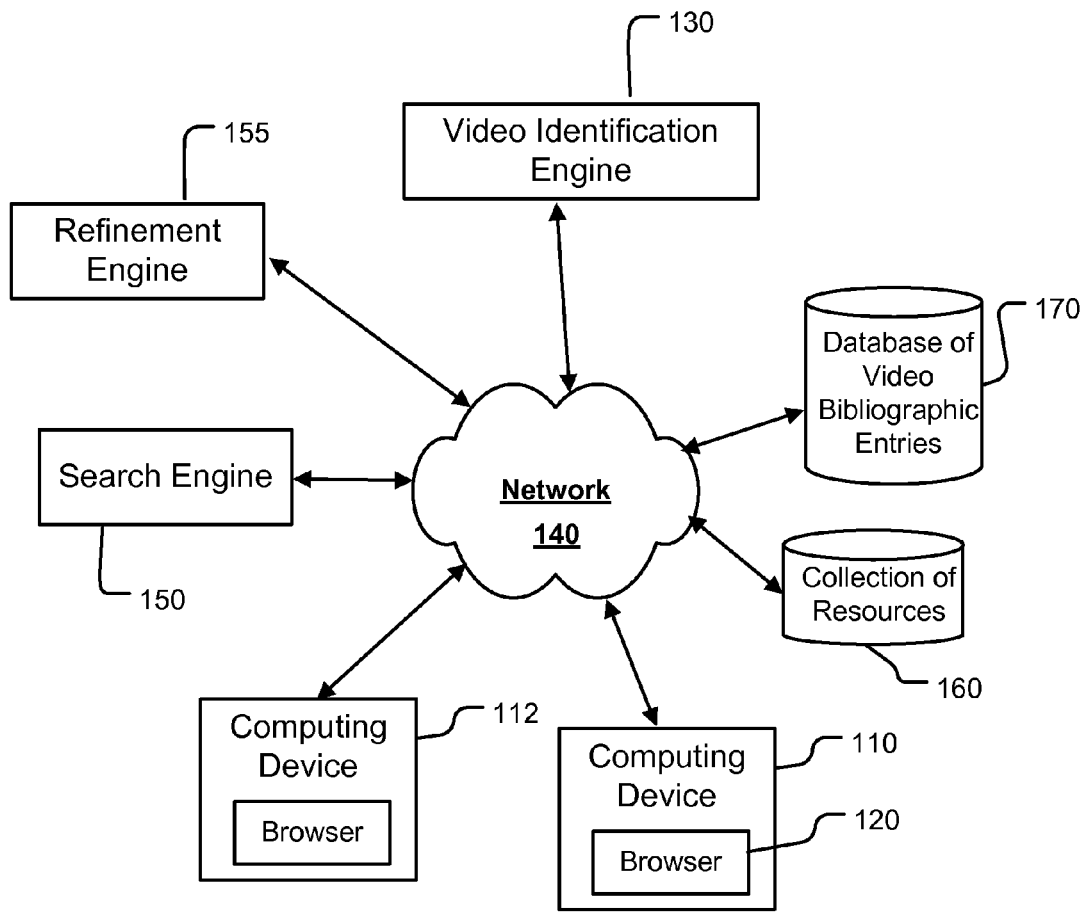
FIG. 1 is a block diagram of an example environment in which identifying video content corresponding to a video bibliographic entry can be used according to one or more implementations.

FIG. 1 illustrates a block diagram of an example environment 100 in which identifying video content corresponding to a video bibliographic entry can be used according to one or more implementations. The environment 100 includes client computing devices 110, 112 and a search engine 150. The environment 100 also includes a communication network 140 that allows for communication between various components of the environment 100.

During operation, users interact with the search engine 150 through client computing devices 110, 112. The client computing devices 110, 112 and the search engine 150 each include memory for storage of data and software applications, a processor for accessing data and executing applications, and components that facilitate communication over the communication network 140. The computing devices 110, 112 execute applications, such as web browsers, e.g. web browser 120 executing on client computing device 110, that allow users to formulate queries and submit them to the search engine 150. The search engine 150 receives queries from the computing devices 110, 112, and executes the queries against a collection 160 of resources which can include text and video content. A resource may for example include a link for playing or downloading the video content.

In response to a user's query, the search engine 150 can generate search results which are transmitted to the computing devices 110, 112 in a form that can be presented to the users. As described in more detail below, these search results provided by the search engine 150 are modified based on video content which has been identified by bibliographic data using the processes described herein. This identification can be used by the search engine 150 to refine the relevance of video content in the resources to a user's query. For example, this identification can be used by the search engine 150 to filter resources or modify the ranking of resources.

For example, in response to a query from the computing device 110, the search engine may transmit a modified search results web page including a list of links to be displayed in the web browser 120 executing on the computing device 110. The resources in the list may be ranked by the search engine 150 according to their relevance. The search engine 150 may for example use filtering techniques to limit the resources in the list to those which include video content. The filtering may for example be performed in response to a user specification that only search results for videos are returned. In some implementations, the resources in the list are not filtered, and all types of resources are returned, including resources that do not contain video content.

The collection 160 may be stored collectively on multiple computers and/or storage devices. In some implementations, the collection 160 is obtained from the World Wide Web. In some implementations, the collection 160 may be limited by specification, and may for example be obtained from a specific domain.

The environment 100 also includes a database 170 of video bibliographic entries. A video bibliographic entry may for example be manually or automatically generated based on known attributes of the video item that is represented by the entry. The database 170 may be collectively stored on one or more computers and/or storage devices. Each video bibliographic entry in the database 170 contains information about a particular video item. In some implementations, a video bibliographic entry is divided into fields, where each field includes terms about a particular attribute of the video item which is represented by the entry. For example, an entry for a movie may for example include fields for the title, description, genre, director, producer, cast members, length, release date, awards, production company, distribution company, etc. As another example, an entry for a television show episode may for example include fields for the show name, episode title, episode number, cast members, length, scheduling information, production company, distribution company, etc. As yet another example, an entry for a music video may for example include fields such as song name, artist(s), album(s), length, band members, composer(s), production company, distribution company, album release year, etc.

The environment 100 also includes a video identification engine 130. The video identification engine 130 is adapted to identify resources in the collection 160 which include video content corresponding to video bibliographic entries in the database 170 using the techniques described herein. The video identification engine 130 can be implemented in hardware, firmware, or software running on hardware. The video identification engine 130 is described in more detail below with reference to FIGS. 2 to 4.

In response to a user's query, the search engine 150 may process the query to determine one or more video items based on the user's query. The processing can include transmitting a video content request to the video identification engine 130 for resources in the collection 160 that include video content identified by bibliographic data using the techniques described herein. In response to the request, the video identification engine 130 may then send information indicating the resources identified by the bibliographic data to the search engine 150. One or more of the resources identified by the bibliographic data can be selected by the search engine 150 and included within the modified search results sent to the user. The modified search results can then be displayed within an application, such as a web browser, executing on the user's computing device.

The environment 100 also includes a refinement engine 155. The refinement engine 155 is responsive to a given query to provide a query refinement which potentially improves on the search quality by refining the query. The given query may be a user's query, or a query formulated by the video identification engine 130. The refinement engine 155 may analyze log files maintained by the search engine 150 to identify query refinements. The log files include user session query data associated with past queries received from users. The log files may collectively be stored on one or more computers and/or storage devices. The log files include search history information including a sequence of queries received from a user. For example, the log files may include an anonymous log of queries, e.g. not traceable to a particular user, or it may maintain a user specific log for the user's future reference, at the user's request.

A query refinement occurs when a user submits a first query, and then follows the first query with another query. A query refinement does not necessarily have to include the first query. Query refinements can indicate how users explore the information space about a particular topic.

The network 140 facilitates communication between the various components in the environment 100. In some implementations, the network 140 includes the Internet. The network 140 can also utilize dedicated or private communications links that are not necessarily part of the Internet. In some implementations, the network 140 uses conventional or other communications technologies protocols, and/or inter-process communication techniques.

Many other configurations are possible having more or less components than the environment 100 shown in FIG. 1. For example, the environment 100 can include multiple search engines. The environment 100 can also include many more computing devices that submit queries to the search engines. In some implementations, the refinement engine 155 and the video identification engine 130 may be components of the search engine 150.

Figure 2:
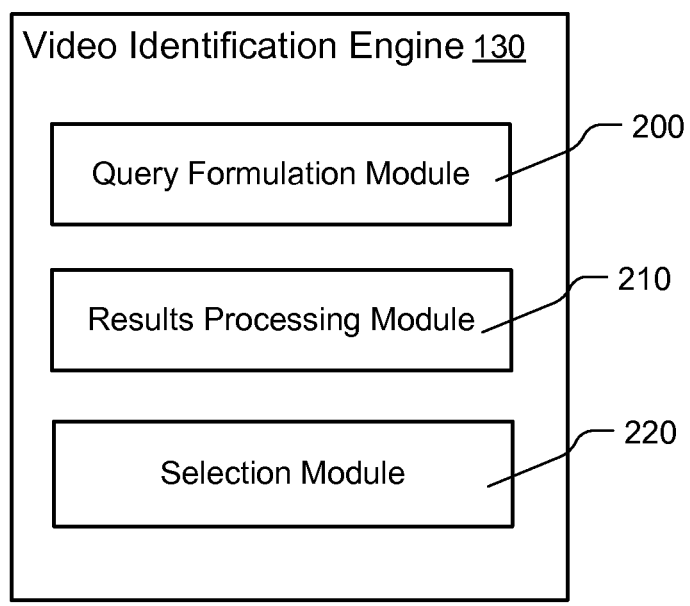
FIG. 2 is a block diagram illustrating example modules within the video identification engine according to one or more implementations.

FIG. 2 is a block diagram illustrating example modules within the video identification engine 130 according to one or more implementations. In FIG. 2, the video identification engine 130 includes a query formulation module 200, a results processing module 210, and a selection module 220. Some implementations may have different and/or additional modules than those shown in FIG. 2. Moreover, the functionalities can be distributed among the modules in a different manner than described here.

The query formulation module 200 formulates one or more queries based on terms in fields of a given video bibliographic entry in the database 170. In some implementations, the formulated query includes terms from one or more fields of the given video bibliographic entry. The formulated query may for example include only terms from one or more particular fields of the given video bibliographic entry. The formulated query may for example include an exact phrase of terms in a given field of the video bibliographic entry, by including quotations surrounding the phrase. As another example, the query may be formulated by removing diacritical marks within terms in fields of the video bibliographic entry. A diacritical mark is a mark added to a letter or character to modify pronunciation. Examples of diacritical marks include a dot and a circumflex.

In some implementations, the formulated query is a query refinement of one or more terms in one or more fields of the given video bibliographic entry. In such a case, the query formulation module can send to the refinement engine 155 an initial query containing terms in a given field, such as the title, of the given bibliographic entry. In response, the refinement engine 155 provides a query refinement of the initial query to the query formulation module 200. The query formulation module 200 can then use the query refinement as the formulated query. The refinement engine 155 may use conventional or other techniques to identify a query refinement.

The query formulation module 200 sends the formulated query to the search engine 150. The search engine 150 identifies a list of resources in the collection 160 which match terms in the formulated query. The search engine 150 then responds by transmitting search results to the video identification engine 130 that include links to the identified resources in the list. The search engine 150 can use conventional or other techniques to identify the list of resources.

The results processing module 210 analyzes the resources in the received list to generate occurrence scores. As described below, the occurrence score for a given resource is based at least in part on whether terms in the fields of the given video bibliographic entry occur within text associated with given video content in the given resource. The techniques for identifying the text associated with the given video content can vary from implementation to implementation.

In some implementations, the text associated with the given video content is adjacent to the given video content. The adjacent text for a given video content is the text in the given resource which is less than a predetermined distance from the given video content, when the resource is rendered in a browser or other application as a viewable resource. Other techniques may alternatively be used.

In some implementations, the results processing module 210 analyzes each resource in the list. In other implementations, the results processing module 210 selects a specified number of resources in the list exceeding a specified ranking.

The results processing module 210 identifies one or more instances of video content within the resources in the list. An instance of video content within a resource can be identified by inspecting the resource for links or other indicators of the presence of a video content file. For a given video content instance, the results processing module 210 then searches and indexes the occurrence of terms in the fields of the given video bibliographic entry within text associated with given video content. The associated text is separate from metadata which is part of the video content file itself, but which can be used to identify the video content. The associated text may for example include a summary or other descriptive text of the video content.

The occurrence information is stored in an occurrence table, or other type of data structure. In some implementations, the occurrence table contains occurrence information identifying the distinct fields of the given video bibliographic entry which have terms occurring in text associated with each of the video content in each of the resources. In another implementation, the results processing module 210 generates an occurrence table on a per-resource basis.

The techniques for determining whether terms in fields of the given video bibliographic entry "occur" within text in a particular resource can be carried out by soft matching the text and the terms in the fields on a field by field basis. For string fields, this can be carried out for example by comparing the strings and imposing an edit distance threshold. For numerical fields, this can be carried out comparing the difference between the text and the data in the field to a threshold value. Other techniques may also be used. In some implementations, normalization processes such as stemming and the removal of stop words may be applied to normalize the text prior to the soft matching.

The results processing module 210 then analyzes the occurrence table(s) of the given video bibliographic entry to calculate occurrence scores for the resources. The techniques for determining the occurrence scores and the range of values can vary from implementation to implementation. For example, the occurrence score for a resource may be based at least in part on the number of fields of the given video bibliographic entry from which terms have been matched. In some implementations, the occurrence score for a resource is equal to the total number of fields which were identified.

The occurrence score may be a weighted average based on which of the fields were identified. In such a case, the occurrence of some fields may be considered to be a better indicator that a resource includes video content identified by the video bibliographic entry than occurrences of other fields.

In some implementations, the occurrence score is based on whether at least one particular field in a group of two or more fields was identified, regardless of the total number of identified fields in the group. For example, if at least one of the particular fields in the group is identified, the occurrence score may be modified to indicate an increased likelihood that the resource includes the video content identified by the video bibliographic entry.

The results processing module 210 may also utilize additional information in calculating the occurrence scores. For example, the occurrence score may further be based on text next to, or within a sentence containing, an occurrence of a field. For example, if the text includes a phrase boundary next to an occurrence of a field, the occurrence score may be modified to indicate an increased likelihood that the resource includes the video content identified by the video bibliographic entry. A phrase boundary is one or more characters used to indicate that one phrase has ended and another phrase in the text is beginning A phrase boundary may be for example an intra-sentence separator or an inter-sentence separator.

An intra-sentence separator is a connection inside a sentence. Examples of intra-sentence separators include a parenthesis, a quote, a bracket, a dash, and a comma. An inter-sentence separator is a connection between sentences. Examples of inter-sentence separators include punctuation and a paragraph separator. The occurrence a phrase boundary can reduce the number of spurious matches in which the text on either side of a phrase boundary matches the field by coincidence. In some implementations, stop words between a phrase boundary and an occurrence of a field are ignored when determining whether the phrase boundary is next to an occurrence of the field.

In some implementations, the occurrence score is based at least on the uniform resource locator (URL) or other unique identifier of the given resource. In such a case, certain unique identifiers may be considered to be a better indicator that a resource includes video content identified by the video bibliographic entry than other identifiers.

In some implementations, the occurrence score is based at least in part on the number of instances of video content in the given resource. For example, the given resource may be a so-called video gallery page which contains links to multiple videos. In such a case, the given resource may be a better indicator that the given resource includes video content corresponding to the video bibliographic entry than a resource which contains a single instance of video content.

In some implementations, the occurrence score is further based on whether terms in fields of the given video bibliographic entry "occur" within metadata, which is part of the video content file itself. The metadata may include for example a description, production date, and length.

The selection module 220 then selects one or more selected resources in the list of resources as including video content corresponding to the video bibliographic entry using the occurrence scores. The number of selected resources for the given video bibliographic entry can vary from implementation to implementation.

In some implementations, a set of resources in the list having occurrence scores above a threshold are identified. The selected resources may for example include all the resources in the set. Alternatively, additional criteria may be applied to the set of resources to select the final selected resources. If none of the resources have an occurrence score exceeding the threshold, the selection module 220 may flag the video bibliographic entry as not having video content available within the collection 160.

In some implementations, the resources in the list of resources are sorted using the occurrence scores to create a ranking. The selected resources may then be selected based on the ranking. Alternatively, other criteria may be used.

The selection module 220 then stores data associating the selected resources with the video bibliographic entry.

The video identification engine 130 may also create an index of the given video content and the associated text, across all the video bibliographic entries. The index can then be used to identify additional video content for the given video bibliographic entry using the same soft matching techniques described above.

Figure 3:
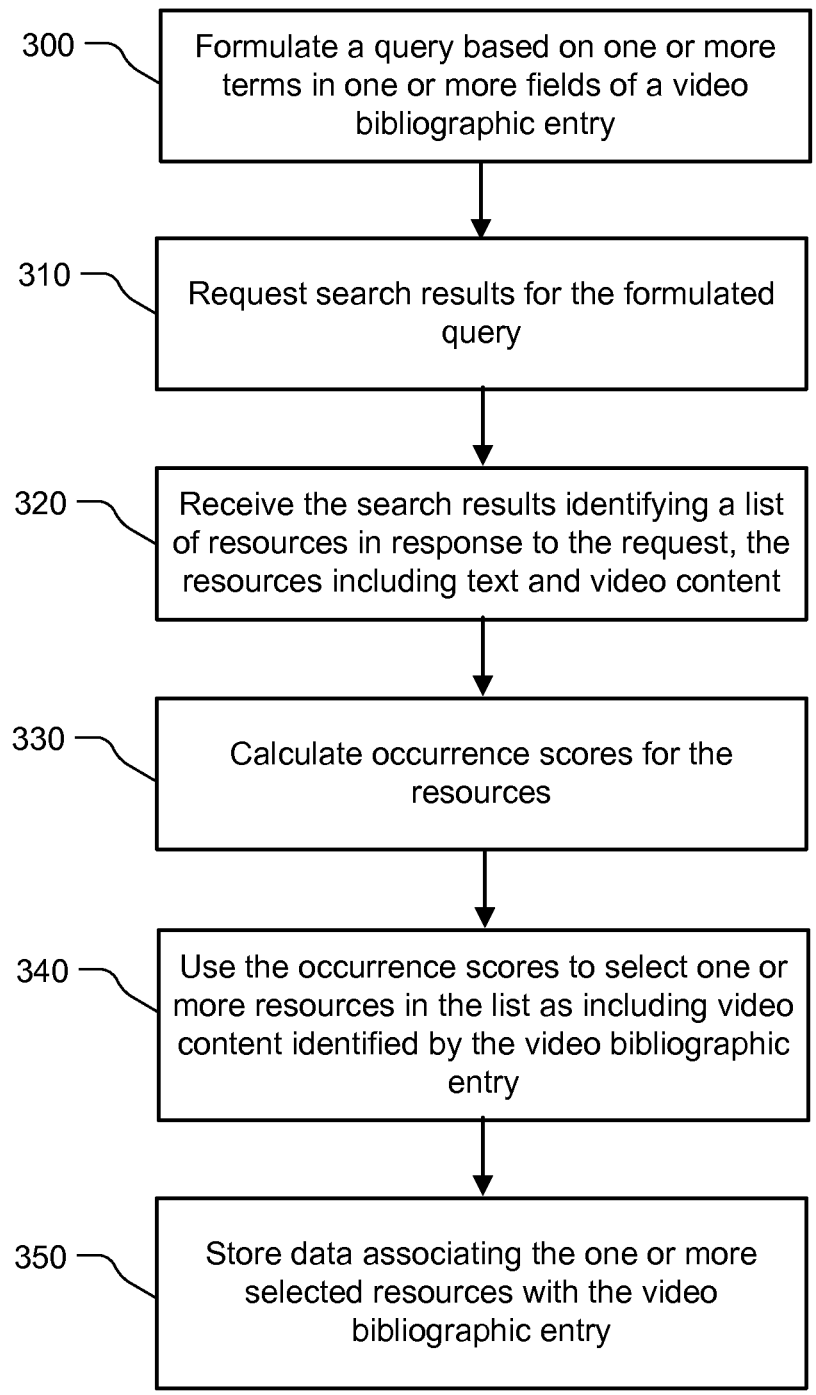
FIG. 3 is a flow chart of an example process that identifies video content corresponding to a video bibliographic entry according to one or more implementations.

FIG. 3 is a flow chart of an example process for identifying video content corresponding to a given video bibliographic entry according to one or more implementations. Other implementations may perform the steps in different orders and/or perform different or additional steps than the ones illustrated in FIG. 3. For convenience, FIG. 3 will be described with reference to a system of one or more computers that performs the process. The system can be, for example, the video identification engine 130 described above with reference to FIG. 1.

At step 300, the system formulates a query based on one or more terms in one or more fields of the given video bibliographic entry. As described above, a variety of different techniques can be used to formulate the query.

At step 310, the system requests search results for the formulated query from the search engine. At step 320, the system receives the search results including a list of resources from the search engine. One or more of the resources in the list include text and video content.

At step 330, the system calculates occurrence scores for the resources in the list. As described above, the occurrence score for a given resource is based at least in part on whether terms in the fields of the given video bibliographic entry occur within text associated with given video content in the given resource.

At step 340, the system uses the occurrence scores to select one or more selected resources in the list as including video content identified by the video bibliographic entry. At step 350, the system stores data associating the one or more selected resources with the video bibliographic entry.

The steps 300, 310, 320 may also be repeated using a variety of differently formulated queries, and the lists of resources for each query may be aggregated together prior to calculating the occurrence scores.

Figure 4:
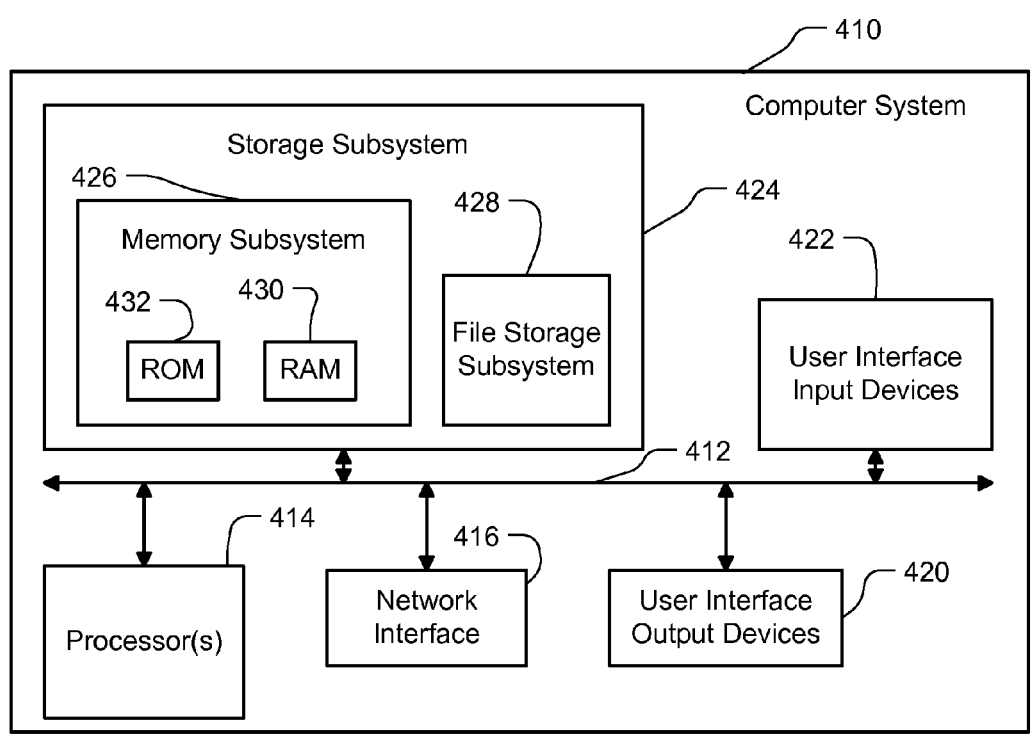
FIG. 4 is a block diagram of an example computer system according to one or more implementations.

FIG. 4 is a block diagram of an example computer system according to one or more implementations. Computer system 410 typically includes at least one processor 414 which communicates with a number of peripheral devices via bus subsystem 412. These peripheral devices may include a storage subsystem 424, comprising for example memory devices and a file storage subsystem, user interface input devices 422, user interface output devices 420, and a network interface subsystem 416. The input and output devices allow user interaction with computer system 410. Network interface subsystem 416 provides an interface to outside networks, including an interface to communication network 140, and is coupled via communication network 140 to corresponding interface devices in other computer systems.

User interface input devices 422 may include a keyboard, pointing devices such as a mouse, trackball, touchpad, or graphics tablet, a scanner, a touchscreen incorporated into the display, audio input devices such as voice recognition systems, microphones, and other types of input devices. In general, use of the term "input device" is intended to include possible types of devices and ways to input information into computer system 410 or onto communication network 418.

User interface output devices 420 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 410 to the user or to another machine or computer system.

Storage subsystem 424 stores programming and data constructs that provide the functionality of some or all of the modules described herein, including the logic to identify video content corresponding to a video bibliographic entry according to the processes described herein. These software modules are generally executed by processor 414 alone or in combination with other processors.

Memory 426 used in the storage subsystem can include a number of memories including a main random access memory (RAM) 432 for storage of instructions and data during program execution and a read only memory (ROM) 430 in which fixed instructions are stored. A file storage subsystem can provide persistent storage for program and data files, and may include a hard disk drive, a floppy disk drive along with associated removable media, a CD-ROM drive, an optical drive, or removable media cartridges. The modules implementing the functionality of certain embodiments may be stored by file storage subsystem in the storage subsystem 424, or in other machines accessible by the processor.

Bus subsystem 412 provides a mechanism for letting the various components and subsystems of computer system 410 communicate with each other as intended. Although bus subsystem 412 is shown schematically as a single bus, alternative embodiments of the bus subsystem may use multiple busses.

Computer system 410 can be of varying types including a workstation, server, computing cluster, blade server, server farm, or any other data processing system or computing device. Due to the ever-changing nature of computers and networks, the description of computer system 410 depicted in FIG. 4 is intended only as a specific example for illustrative purposes. Many other configurations of computer system 410 are possible having more or less components than the computer system depicted in FIG. 4.

While the present technology is disclosed by reference to the embodiments and examples detailed above, it is understood that these examples are intended in an illustrative rather than in a limiting sense. Computer-assisted processing is implicated in the described embodiments. Accordingly, the present technologies may be embodied in methods for identifying video content corresponding to a video bibliographic entry, systems including logic and resources to identify video content corresponding to a video bibliographic entry, systems that take advantage of computer-assisted methods for identifying video content corresponding to a video bibliographic entry, non-transitory, computer readable media impressed with logic to identify video content corresponding to a video bibliographic entry, data streams impressed with logic to identifying video content corresponding to a video bibliographic entry, or computer-accessible services that carry out computer-assisted methods to identify video content corresponding to a video bibliographic entry. It is contemplated that other modifications and combinations will be within the scope of the following claims.

We claim as follows:

1. A method including:
   formulating, by one or more devices, a query based on one or more terms in one of more fields of a video bibliographic entry;
   sending, by the one or more devices and based on the formulated query, a request for search results;
   receiving, by the one or more devices and based on the request, search results identifying a plurality of resources;
   identifying, by the one or more devices and based on the identified plurality of resources, one or more resources, of the identified plurality of resources, that are associated with video content;
   calculating, by the one or more devices, a respective occurrence score for each of the identified one or more resources,
      each respective occurrence score being based on a plurality of terms in the one or more fields of the video bibliographic entry matching a plurality of terms associated with a respective resource of the identified one or more resources,
      each respective occurrence score being based on the plurality of terms in the one or more fields of the video bibliographic entry occurring within a plurality of terms adjacent to the video content associated with the respective resource, and
      each respective occurrence score being based on a uniform resource locator associated with the respective resource;
   selecting, by the one or more devices, at least one of the identified one or more resources with a respective occurrence score that satisfies an occurrence score threshold;
   storing, by the one or more devices, information indicating an association of the video bibliographic entry and the selected at least one of the identified one or more resources; and using, by the one or more devices, the stored information to process another query,
the other query including a request for video content.

2. The method of claim 1, where the formulated query includes terms in a particular field of the video bibliographic entry.

3. The method of claim 1, where the formulated query is based on one or more query refinements for one or more terms in a particular field of the video bibliographic entry.

4. The method of claim 1, where each respective occurrence score is further based on differently weighted fields, of the one or more fields of the video bibliographic entry, having one or more terms matching at least one of the plurality of terms associated with the respective resource.

5. The method of claim 1, where each respective occurrence score is further based on whether the plurality of terms, associated with the respective resource, are associated with a phrase boundary next to an occurrence of one or more terms in a particular field of the one or more fields of the video bibliographic entry.

6. The method of claim 1, where each respective occurrence score is further based on a number of instances of video content associated with the respective resource.

7. The method of claim 1, where, when selecting the at least one of the identified one or more resources, the method includes:
ranking the identified one or more resources with respective occurrence scores that satisfy the occurrence score threshold; and
selecting, based on the ranking, the at least one of the identified one or more resources.

8. A non-transitory computer readable storage medium storing instructions, the instructions including:
one or more instructions which, when executed by at least one processor, cause the at least one processor to:
formulate a query based on one or more terms in one or more fields of a video bibliographic entry;
send, based on the formulated query, a request for search results;
receive, based on the request, search results identifying a plurality of resources;
identify, based on the identified plurality of resources, one or more resources, of the identified plurality of resources, that are associated with video content;
calculate a respective occurrence score for each of the identified one or more resources,
each respective occurrence score being based on a plurality of terms in the one or more fields of the video bibliographic entry matching a plurality of terms associated with a respective resource of the identified one or more resources,
each respective occurrence score being based on the plurality of terms in the one or more fields of the video bibliographic entry occurring within a plurality of terms adjacent to the video content associated with the respective resource, and
each respective occurrence score being based on a uniform resource locator associated with the respective resource;
select at least one of the identified one or more resources with a respective occurrence score that satisfies an occurrence score threshold;
store information indicating an association of the video bibliographic entry and the selected at least one of the identified one or more resources; and
use the stored information to process another query,
the other query including a request for video content.

9. The non-transitory computer readable storage medium of claim 8, where the formulated query includes terms in a particular field of the video bibliographic entry.

10. The non-transitory computer readable storage medium of claim 8, where the formulated query is based on one or more query refinements for one or more terms in a particular field of the video bibliographic entry.

11. The non-transitory computer readable storage medium of claim 8, where each respective occurrence score is further based on differently weighted fields, of the one or more fields of the video bibliographic entry, having one or more terms matching at least one of the plurality of terms associated with the respective resource.

12. The non-transitory computer readable storage medium of claim 8, where each respective occurrence score is further based on whether the plurality of terms, associated with the respective resource, are associated with a phrase boundary next to an occurrence of one or more terms in a particular field of the one or more fields of the video bibliographic entry.

13. The non-transitory computer readable storage medium of claim 8, where each respective occurrence score is further based on a number of instances of video content associated with the respective resource.

14. The non-transitory computer readable storage medium of claim 8, where the one or more instructions to select the at least one of the identified one or more resources include:
one or more instructions to rank the identified one or more resources with respective occurrence scores that satisfy the occurrence score threshold; and
one or more instructions to select, based on the ranking, the at least one of the identified one or more resources.

15. A system comprising:
one or more devices to:
formulate a query based on one or more terms in one or more fields of a video bibliographic entry;
send, based on the formulated query, a request for search results;
receive, based on the request, search results identifying a plurality of resources;
identify, based on the identified plurality of resources, one or more resources, of the identified plurality of resources, that are associated with video content;
calculate a respective occurrence score for each of the identified one or more resources,
each respective occurrence score being based on a plurality of terms in the one or more fields of the video bibliographic entry matching a plurality of terms associated with a respective resource of the identified one or more resources,
each respective occurrence score being based on the plurality of terms in the one or more fields of the video bibliographic entry occurring within a plurality of terms adjacent to the video content associated with the respective resource, and
each respective occurrence score being based on a uniform resource locator associated with the respective resource;
select at least one of the identified one or more resources with a respective occurrence score that satisfies an occurrence score threshold;
store information indicating an association of the video bibliographic entry and the selected at least one of the identified one or more resources; and
use the stored information to process another query,
the other query including a request for video content.

16. The system of claim 15, where the formulated query includes terms in a particular field of the video bibliographic entry.

17. The system of claim 15, where the formulated query is based on one or more query refinements for one or more terms in a particular field of the video bibliographic entry.

18. The system of claim 15, where each respective occurrence score is further based on differently weighted fields, of the one or more fields of the video bibliographic entry, having one or more terms matching at least one of the plurality of terms associated with the respective resource.

19. The system of claim 15, where each respective occurrence score is further based on whether the plurality of terms, associated with the respective resource, are associated with a phrase boundary next to an occurrence of one or more terms in a particular field of the one or more fields of the video bibliographic entry.

20. The system of claim 15, where each respective occurrence score is further based on a number of instances of video content associated with the respective resource.

21. The system of claim 15, where the one or more devices are further to:
    rank the identified one or more resources with respective occurrence scores that satisfy the occurrence score threshold; and
    select, based on the ranking, the at least one of the identified one or more resources.

\* \* \* \* \*